(12) United States Patent
Kallakuri et al.

(10) Patent No.: US 10,616,340 B2
(45) Date of Patent: Apr. 7, 2020

(54) DISTRIBUTED COMPUTING OF LARGE DATA BY SELECTING A COMPUTATIONAL RESOURCE OF A REMOTE SERVER BASED ON SELECTION POLICIES AND DATA INFORMATION WHEREIN THE SELECTIONS POLICIES ARE ASSOCIATED WITH LOCATION CONSTRAINTS, TIME CONSTRAINTS, AND DATA TYPE CONSTRAINTS

(71) Applicant: Standard Cognition, Corp., San Francisco, CA (US)

(72) Inventors: Nagasrikanth Kallakuri, San Francisco, CA (US); Akshay Goel, San Francisco, CA (US); Tushar Dadlani, Pleasanton, CA (US)

(73) Assignee: Standard Cognition, Corp., San Francisco, CA (US)

( * ) Notice: Subject to any disclaimer, the term of this patent is extended or adjusted under 35 U.S.C. 154(b) by 0 days.

(21) Appl. No.: 15/904,281

(22) Filed: Feb. 23, 2018

(65) Prior Publication Data
US 2019/0268416 A1   Aug. 29, 2019

(51) Int. Cl.
*H04L 29/08* (2006.01)
*H04L 12/24* (2006.01)
*H04L 29/06* (2006.01)

(52) U.S. Cl.
CPC ...... *H04L 67/1097* (2013.01); *H04L 41/0893* (2013.01); *H04L 67/42* (2013.01)

(58) Field of Classification Search
CPC .. H04L 67/1097; H04L 41/0893; H04L 67/42
See application file for complete search history.

(56) References Cited

U.S. PATENT DOCUMENTS

| 5,657,317 | A | 8/1997 | Mahany et al. | |
|---|---|---|---|---|
| 5,696,903 | A | 12/1997 | Mahany | |
| 6,842,786 | B1 * | 1/2005 | Webb | H04L 29/06 709/201 |
| 6,928,264 | B2 * | 8/2005 | Botteck | H04W 4/00 455/41.2 |
| 7,020,701 | B1 * | 3/2006 | Gelvin | G01D 21/00 250/332 |

(Continued)

OTHER PUBLICATIONS

U.S. Appl. No. 15/904,277—Office Action dated Sep. 16, 2019, 18 pages.

*Primary Examiner* — Daniel C. Murray
(74) *Attorney, Agent, or Firm* — Haynes Beffel & Wolfeld LLP; Mark A. Haynes; Andrew L. Dunlap (57) ABSTRACT

The technology disclosed allows for remote distributed computing and storage of data obtained from one or more client devices. Specifically, the technology disclosed is capable of receiving, at the client device, data from at least one data source. The technology discloses is also capable of determining, at the client device, data information associated with the data from the at least one data source, selecting a computation resource from a plurality of computation resources based on one or more selection policies, where the selection policies are associated with one or more of location constraints, time constraints, and data type constraints and sending the data from the client device to the selected computation resource for processing.

21 Claims, 6 Drawing Sheets

(56) References Cited

U.S. PATENT DOCUMENTS

| | | | |
|---|---|---|---|
| 7,092,985 B2* | 8/2006 | Hubbard | G06F 9/5044 709/201 |
| 8,005,505 B2* | 8/2011 | Parry | H04W 88/06 455/556.1 |
| 8,230,426 B2* | 7/2012 | Powers | H04L 67/10 712/28 |
| 8,467,324 B2 | 6/2013 | Yousefi et al. | |
| 8,750,306 B2 | 6/2014 | Yousefi et al. | |
| 8,804,734 B2 | 8/2014 | Yousefi et al. | |
| 8,976,744 B2 | 3/2015 | Yousefi et al. | |
| 9,002,930 B1* | 4/2015 | Want | H04L 67/1097 709/203 |
| 9,077,586 B2 | 7/2015 | Yousefi et al. | |
| 9,180,783 B1 | 11/2015 | Penilla et al. | |
| 9,215,124 B2 | 12/2015 | Yousefi et al. | |
| 9,258,173 B2 | 2/2016 | Yousefi et al. | |
| 9,332,261 B2 | 5/2016 | Yousefi et al. | |
| 9,374,276 B2* | 6/2016 | Batrouni | H04L 67/2833 |
| 9,479,453 B2 | 10/2016 | Yousefi et al. | |
| 9,621,477 B2* | 4/2017 | Hwang | G06F 9/5044 |
| 9,781,195 B2* | 10/2017 | Ahn | H04L 67/10 |
| 9,813,354 B2 | 11/2017 | Yousefi et al. | |
| 9,967,172 B2 | 5/2018 | Kao et al. | |
| 9,985,907 B2 | 5/2018 | Yousefi et al. | |
| 10,021,041 B2 | 7/2018 | Yousefi et al. | |
| 2002/0036987 A1 | 3/2002 | Garcia-Luna-Aceves et al. | |
| 2002/0052719 A1* | 5/2002 | Alexander | H04L 41/22 702/188 |
| 2003/0054765 A1* | 3/2003 | Botteck | H04W 4/00 455/41.1 |
| 2003/0161327 A1* | 8/2003 | Vlodavsky | H04L 29/06 370/395.52 |
| 2005/0114760 A1* | 5/2005 | Arregui | G06F 16/93 715/234 |
| 2005/0193135 A1* | 9/2005 | Owen | G06F 8/41 709/230 |
| 2005/0251580 A1* | 11/2005 | Tu | G06F 9/5061 709/236 |
| 2007/0050240 A1 | 3/2007 | Belani et al. | |
| 2008/0163231 A1* | 7/2008 | Breen | G06Q 10/06 718/104 |
| 2009/0116430 A1 | 5/2009 | Bonta et al. | |
| 2009/0259720 A1* | 10/2009 | Heins | G06Q 10/10 709/205 |
| 2010/0030810 A1* | 2/2010 | Marr | G06F 16/29 709/217 |
| 2010/0061272 A1 | 3/2010 | Veillette | |
| 2010/0229108 A1* | 9/2010 | Gerson | G06F 3/011 715/757 |
| 2010/0272258 A1* | 10/2010 | Sadovsky | G06F 9/5027 380/255 |
| 2010/0285781 A1* | 11/2010 | Dai | H04M 3/42 455/414.1 |
| 2011/0006913 A1 | 1/2011 | Chen et al. | |
| 2011/0145374 A1* | 6/2011 | Lee | H04L 47/2416 709/220 |
| 2011/0201280 A1 | 8/2011 | Dolfini et al. | |
| 2012/0042000 A1* | 2/2012 | Heins | G06Q 10/10 709/201 |
| 2012/0042327 A1* | 2/2012 | Gokhale | G06F 9/52 719/330 |
| 2012/0060100 A1* | 3/2012 | Sherwood | H04N 21/4122 715/748 |
| 2012/0105637 A1 | 5/2012 | Yousefi et al. | |
| 2012/0106446 A1 | 5/2012 | Yousefi et al. | |
| 2012/0106549 A1 | 5/2012 | Yousefi et al. | |
| 2012/0106653 A1 | 5/2012 | Yousefi et al. | |
| 2012/0109406 A1 | 5/2012 | Yousefi et al. | |
| 2012/0109446 A1 | 5/2012 | Yousefi et al. | |
| 2012/0109447 A1 | 5/2012 | Yousefi et al. | |
| 2012/0185558 A1* | 7/2012 | Ryder | H04L 67/1097 709/217 |
| 2012/0185569 A1* | 7/2012 | Das | H04L 67/12 709/219 |
| 2012/0218883 A1 | 8/2012 | Xu et al. | |
| 2012/0327840 A1 | 12/2012 | Chen et al. | |
| 2013/0054763 A1* | 2/2013 | Van der Merwe | H04W 8/12 709/220 |
| 2013/0081005 A1* | 3/2013 | Gounares | G06F 9/5016 717/148 |
| 2013/0159550 A1 | 6/2013 | Vasseur | |
| 2013/0188513 A1 | 7/2013 | Vasseur et al. | |
| 2013/0250933 A1 | 9/2013 | Yousefi et al. | |
| 2013/0325407 A1* | 12/2013 | Lee | G06F 17/00 702/188 |
| 2013/0339605 A1* | 12/2013 | Factor | G06F 16/10 711/118 |
| 2014/0036728 A1 | 2/2014 | An et al. | |
| 2014/0122558 A1* | 5/2014 | Azar | G06F 9/5094 709/201 |
| 2014/0122725 A1* | 5/2014 | Batrouni | H04L 67/2842 709/226 |
| 2014/0143355 A1* | 5/2014 | Berdis | H04L 51/04 709/206 |
| 2014/0211803 A1 | 7/2014 | Yousefi et al. | |
| 2014/0258376 A1* | 9/2014 | Haddad | H04L 67/1002 709/203 |
| 2015/0002308 A1 | 1/2015 | Walley et al. | |
| 2015/0006616 A1 | 1/2015 | Walley et al. | |
| 2015/0052214 A1* | 2/2015 | Zhao | H04L 67/1008 709/211 |
| 2015/0065142 A1 | 3/2015 | Song | |
| 2015/0156279 A1* | 6/2015 | Vaswani | H04L 67/42 709/203 |
| 2015/0156280 A1* | 6/2015 | Vaswani | H04L 67/42 709/203 |
| 2015/0163819 A1 | 6/2015 | Yousefi et al. | |
| 2015/0205818 A1* | 7/2015 | Darcy | G06F 3/06 707/822 |
| 2015/0326488 A1 | 11/2015 | Yousefi et al. | |
| 2015/0327028 A1 | 11/2015 | Zhang et al. | |
| 2015/0358810 A1* | 12/2015 | Chao | H04W 52/0209 455/418 |
| 2015/0365664 A1 | 12/2015 | Yousefi et al. | |
| 2016/0016523 A1 | 1/2016 | Yousefi et al. | |
| 2016/0117928 A1 | 4/2016 | Hodges et al. | |
| 2016/0119410 A1* | 4/2016 | Ahn | H04L 67/10 455/500 |
| 2016/0134562 A1 | 5/2016 | Yousefi et al. | |
| 2016/0198485 A1 | 7/2016 | Yousefi et al. | |
| 2016/0294839 A1* | 10/2016 | Walline | G06F 16/23 |
| 2016/0294872 A1* | 10/2016 | Walline | H04L 63/20 |
| 2016/0294918 A1* | 10/2016 | Walline | H04L 67/06 |
| 2016/0337441 A1* | 11/2016 | Bloomquist | G06F 9/5061 |
| 2016/0360560 A1* | 12/2016 | Jiang | H04W 76/10 |
| 2017/0228221 A1 | 8/2017 | Ohmert | |
| 2017/0280102 A1* | 9/2017 | Burke | H04N 1/2183 |
| 2018/0137692 A1 | 5/2018 | Ohmert | |
| 2018/0189137 A1* | 7/2018 | De Keyser | G06F 16/185 |
| 2018/0278546 A1 | 9/2018 | Yousefi et al. | |
| 2018/0300964 A1 | 10/2018 | Lakshamanan et al. | |
| 2018/0302338 A1 | 10/2018 | Yousefi et al. | |
| 2018/0317067 A1 | 11/2018 | Ameixieira | |
| 2018/0338001 A1 | 11/2018 | Pereira Cabral et al. | |
| 2018/0376306 A1 | 12/2018 | Ramalho de Oliveira | |
| 2018/0376357 A1 | 12/2018 | Tavares Coutinho et al. | |
| 2019/0007484 A1 | 1/2019 | Chen et al. | |
| 2019/0009790 A1 | 1/2019 | Michalakis et al. | |
| 2019/0017828 A1 | 1/2019 | Harish et al. | |
| 2019/0047581 A1 | 2/2019 | Bai et al. | |
| 2019/0050718 A1 | 2/2019 | Tickoo et al. | |
| 2019/0120964 A1 | 4/2019 | Luo et al. | |
| 2019/0156678 A1 | 5/2019 | Cole | |

* cited by examiner

DISTRIBUTED COMPUTING OF LARGE DATA BY SELECTING A COMPUTATIONAL RESOURCE OF A REMOTE SERVER BASED ON SELECTION POLICIES AND DATA INFORMATION WHEREIN THE SELECTIONS POLICIES ARE ASSOCIATED WITH LOCATION CONSTRAINTS, TIME CONSTRAINTS, AND DATA TYPE CONSTRAINTS

BACKGROUND

With the advent of mobile computing, there has been a proliferation of data transferred between smartphones and web browsers and web companies. In order to preserve network bandwidth, most web companies that have large data volume to be served to their customers require data storage closer to their customers. Such data is typically image and video data. This need to store and serve large volume data assets closer to customers is typically satisfied by a content delivery network. Data storage at a content delivery network is usually handled on servers primarily in an offline fashion, which avoids real-time analysis and processing capabilities.

SUMMARY

Embodiments of the disclosed invention generally relate to the distributed computing of data. In some embodiments, a system includes one or more processors, and includes logic encoded in one or more non-transitory computer-readable storage media for execution by the one or more processors. When executed, the logic is operable to perform operations including: receiving, at a client device, data from at least one data source; determining, at the client device, data information associated with the data from the at least one data source; selecting a computation resource from a plurality of computation resources based on one or more selection policies; and sending the data from the client device to the selected computation resource for processing.

With further regard to the system, in some embodiments, the data from the at least one data source includes photos, and the at least one data source is a camera. In some embodiments, the data from the at least one data source includes sensor data, and the at least one data source is a sensor. In some embodiments, the data information includes location information associated with the at least one data source. In some embodiments, the data information includes time information associated with the at least one data source. In some embodiments, the data information includes a type of file in which the data is stored. In some embodiments, at least one selection policy is to select a computation resource based on the location of the at least one data source. In some embodiments, at least one selection policy is to select a computation resource based on one or more characteristics of the computation resource.

In some embodiments, a computer-readable storage medium carries one or more sequences of instructions thereon. When executed by one or more processors, the instructions cause the one or more processors to perform operations including: receiving, at a client device, data from at least one data source; determining, at the client device, data information associated with the data from the at least one data source; selecting a computation resource from a plurality of computation resources based on one or more selection policies; and sending the data from the client device to the selected computation resource for processing.

With further regard to the computer-readable storage medium, in some embodiments, the data from the at least one data source includes photos, and the at least one data source is a camera. In some embodiments, the data from the at least one data source includes sensor data, and the at least one data source is a sensor. In some embodiments, the data information includes location information associated with the at least one data source. In some embodiments, the data information includes time information associated with the at least one data source. In some embodiments, the data information includes a type of file in which the data is stored. In some embodiments, at least one selection policy is to select a computation resource based on the location of the at least one data source. In some embodiments, at least one selection policy is to select a computation resource based on one or more characteristics of the computation resource.

In some embodiments, a method includes receiving, at a client device, data from at least one data source. The method further includes determining, at the client device, data information associated with the data from the at least one data source. The method further includes selecting a computation resource for the data from a plurality of computation resources based on one or more selection policies, where the selection policies are associated with one or more of location constraints, time constraints, and data type constraints. The method further includes sending the data from the client device to the selected computation resource for processing.

With further regard to the method, in some embodiments, the data from the at least one data source includes photos, and the at least one data source is a camera. In some embodiments, the data from the at least one data source includes sensor data, and the at least one data source is a sensor. In some embodiments, the data information includes location information associated with the at least one data source.

A further understanding of the nature and the advantages of particular embodiments disclosed herein may be realized by reference of the remaining portions of the specification and the attached drawings.

DETAILED DESCRIPTION

The inventions described herein achieve distributed computing of large data. In various embodiments, a system such as a client device selectively sends data from the client device to one or more selected computation resources based on various selection policies. As described in more detail herein, such selection policies require criteria associated with the data and/or with the computation resources. Such computation resources may be involved in data acquisition, processing, serving, monitoring, etc.

The embodiments provide an intelligent and context aware distributed computing platform for spatially relevant large data applications. As described in more detail herein, in the disclosed distributed computing platform, the location of the data storage, the processing of the data, and the retrieval of the data are informed by the time, location, and the nature of the input data on which the computation is to be performed. In some embodiments, the location, processing, and retrieval of the data may also be informed by other characteristics of the computation infrastructure, such as current load, network latency, bandwidth, available memory, etc.

In another embodiment, a system such as a client device receives data from at least one data source. The client device further determines data information associated with data. The client device further selects a computation resource from a plurality of computation resources based on one or more selection policies. The client device further sends the data from the client device to the selected computation resource for processing.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Figure 1:
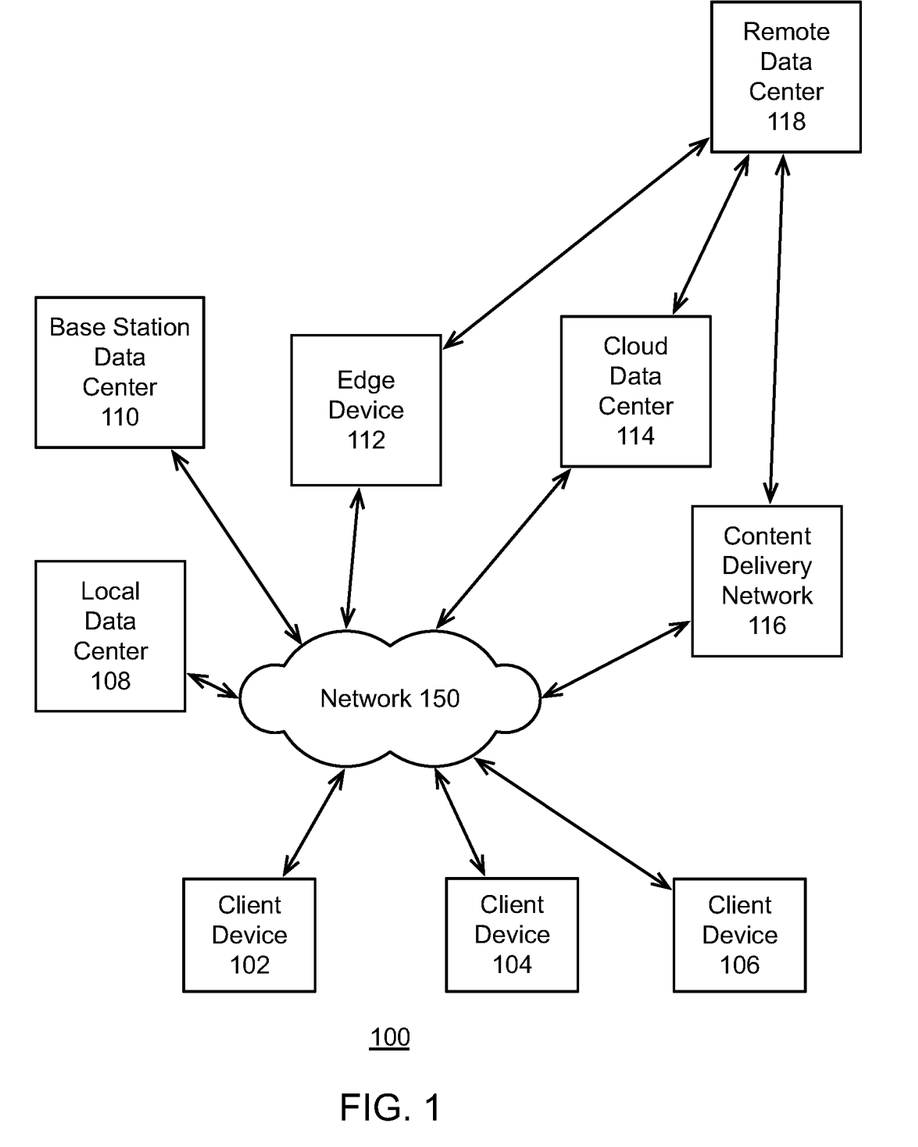
FIG. 1 illustrates a block diagram of an example network environment 100, which may be used for some embodiments described herein.

FIG. 1 illustrates a block diagram of an example network environment 100, which may be used for some embodiments described herein. In some embodiments, network environment 100 includes client devices 102, 104, and 106. Client devices 102, 104, and 106 may represent devices that acquire data, process data for user consumption, and/or send data to other systems further processing. For example, a given client device may be a cell phone, a wearable device, a tablet, a computer, a drone, an augmented reality (AR) headset, a virtual reality (VR) headset, a component of an autonomous vehicle or driven vehicle, etc. Further embodiments of a client device such as client devices 102, 104, and 106 are described in detail herein.

For ease of illustration, FIG. 1 shows three blocks for client devices 102, 104, and 106, and one block for each of local data center 108, base station data center 110, edge device 112, cloud data center 114, CDN 116, and remote data center 118. These blocks may represent multiple respective client devices and computation resources, and networks. In other embodiments, network environment 100 may not have all of the components shown and/or may have other elements including other types of elements instead of, or in addition to, those shown herein.

In various embodiments, a computation resource may include computing elements such as central processing units (CPUs), graphics processing units (GPUs), etc. A data center may also include storage elements such as disks, memories, etc.). Computation resources function to provide data acquisition, data storage, data processing, data serving, data monitoring, data retrieval, etc. As indicated herein, computation resources may include local data centers, base station data centers, edge devices, cloud servers, content delivery networks, remote data centers, etc. In some embodiments, a computation resource may be a cellular tower that has computation and/or storage capacity, where the cellular tower may function as a computation resource. These various types of computation resources may be distributed across one or more geographic regions.

Also shown in network environment 100 are various types of computation resources, including a local data center 108, a base station data center 110, an edge device 112, a cloud data center 114, a content delivery network (CDN) 116, and a remote data center 118. The elements of network environment 100 of FIG. 1 may communicate via a network 150. Operations of the elements of network environment 100 are described in more detail herein.

As described in more detail herein, in various embodiments, a given client device intelligently sends data to a computation resource based on a selection process, which may involve one or more selection policies. For example, a client device may send data to a particular computation resource based on the location of the client device, the time that the data was acquired, the type of data, characteristics of the computation resource, etc. Other metrics are possible. For example, a selection process may be based on closeness to the client device, which may be defined by the type or quality of connectivity between the computation resource and a client device. For example, a computation resource that is geographically distant from a client device may be selected if connected via fiber optic cable.

Computation resources 108 to 118 may be provided either by an organization on their private network or may be located in large data centers. As shown in the example of FIG. 1, a client device may exchange data directly with a computation resource. A client device may exchange data directly with remote data center 118 via another data center such as edge device 112, cloud data center 114, and/or CDN 116. While remote data center 118 may be further away physically, remote data center 118 may be selected due to having computation power or other required resources such as storage that other available computation resource do not have.

In some embodiments, local data center 108 is a computation resource that is local, or dedicated to a particular geographic area such as a city, metropolitan area, region, or in some cases even a few states. In various embodiments, local data center 108 may have high-bandwidth connections with base station data centers such as base station data center 110 and/or with cloud providers via computation resources such as cloud data center 114. In some embodiments, local data center 108 may receive inputs directly from a sensor data acquisition platform (e.g., on a client device). The input may include raw data coming in from the sensors of a client device, processed data by the data acquisition platform of a client device, and/or processed aggregates of data coming from multiple data centers and or multiple client devices.

In some embodiments, base station data center 110 is a computation resource located at a telecommunication tower location. In some embodiments, local data center 108 may receive inputs directly from a sensor data acquisition platform (e.g., on a client device). The input may include raw data coming in from the sensors of a client device, processed data by the data acquisition platform of a client device, and/or processed aggregates of data coming from multiple client devices. In some embodiments, the input may be received over a wireless radio network such as LTE/3G/4G/5G. In some embodiments, data processing that occurs at base station data center 110 occurs for a limited time period (e.g., information about a road accident, temporary construction zones, changing weather conditions, etc.) or is specifically targeted for insights within a certain region of interest.

In some embodiments, cloud data center 114 is a large computation resource that provides on-demand services such as storage, computing, and networking for a variety of business applications. Cloud data center 114 may also provide other value added services for performing specific types of computation, such as application deployments. Input to cloud data center 114 may include data that is an aggregate of data from multiple physical locations. The type of input data at the cloud layer may be either data received directly from sensor data acquisition units of the client device, or data that was intermediately processed at a data center closer to the client device whose sensor values were recorded. If cloud data center 114 is closer to the client device, under certain circumstances cloud data center 114 may function as a local data center. Cloud data center 114 may be responsible for various types of data processing and data infrastructure management.

Figure 2:
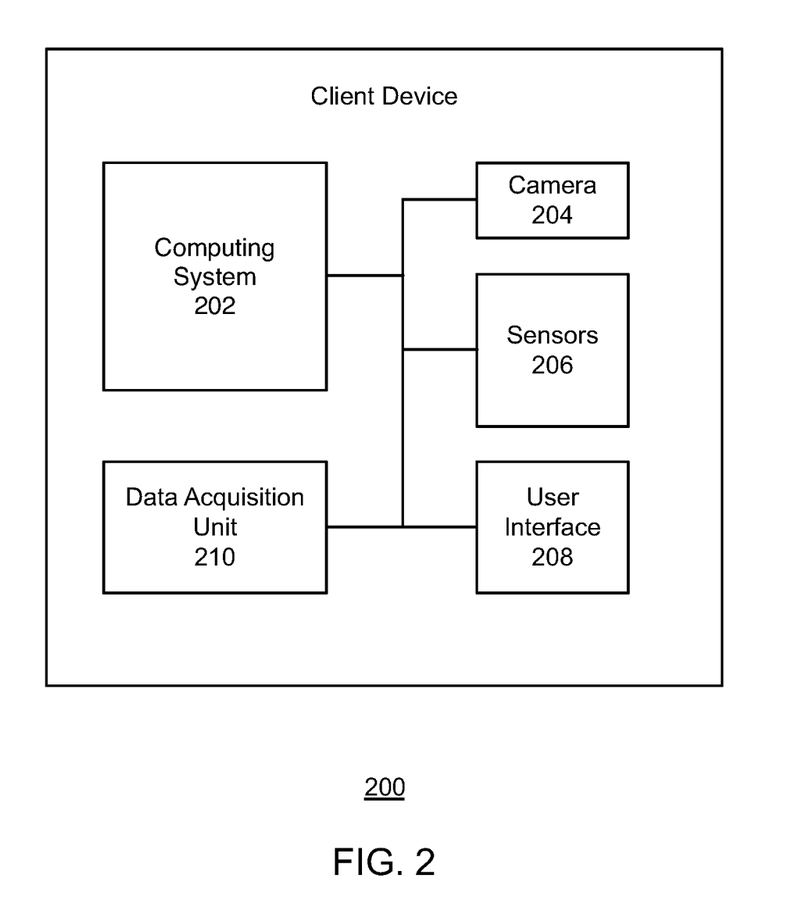
FIG. 2 illustrates a block diagram of an example client device 200, which may be used for some embodiments described herein.

FIG. 2 illustrates a block diagram of an example client device 200, which may be used for some embodiments described herein. For example, client device 200 may be used to implement any of client devices 102, 104, and 106 of FIG. 1. Client device 200 may include a computing system 202, various input components such as a camera 204, sensors 206, and user interface 208. Client device 200 also includes a data acquisition unit 210.

As indicated above, in various embodiments, client device 200 may represent any device that acquires data, processes data for user consumption, and/or sends data to other systems for further processing. For example, client device 200 may be a cell phone, a wearable device, a tablet, a computer, a component of an autonomous vehicle or driven vehicle, etc.

An example computing system, which may be used to implement computing system 202 is described in more detail below in connection with the computing system of FIG. 6. Camera 204 may include any suitable device that captures images. Such images may be in the form of still images, photos, and/or videos. Camera 204 may also incorporate various technologies such as two-dimension camera technology, three-dimension camera technology, infrared camera technology, etc.

In various embodiments, sensors 206 may include various types of digital sensors, where each sensor records particular information about its environment and converts a physical measurement into data for consumption by other computers such as a client device or computers of a computation resource. The sensor primarily processes physical information through physical and electronic components. Sensors 206 may include sensors such as thermometers, humidity, accelerometers, GPS, barometers, gyroscopes, etc. The types of sensors may vary, depending on the particular embodiments. For example, sensors 206 may include sensors in connection with various applications such as autonomous vehicles, driven vehicles, etc. Sensors 206 may also include perception sensors, positioning sensors, and vehicle state estimation sensors, among other sensors. Such sensors may include, for example, light detection and ranging (LiDAR) sensors, cameras, infrared cameras, radars, sonars, Doppler sensors, inertial measurement units (IMUs), global position estimation sensors including global position system (GPS) sensors, inertial measurement unit (IMU) sensors, velocity sensors, odometry sensors, etc.

User interface 208 may be used to collect data from a user. Such data may be provided by user-approved social media connections, search terms inputted by the user at the client device, voice commands provided by the user, mouse clicks, user selections on a touchpad on smartphones and tablets, etc.

Data acquisition unit 210 is a device that collects data. Data acquisition unit 210 may acquire raw sensor data from one or more sensors 206, filtered data from a co-processor associated with a sensor, or data received over a particular communication channel, which may be a communication channel within client device 200 or a communication channel external to client device 200 (e.g., via a network, etc.). In various embodiments, data acquisition unit 210 may use a computer such as computing system 202 to which sensors 206 are connected and/or an embedded device through which sensor data is acquired. Data acquisition unit 210 may include processors that perform encryption/decryption and encoding of data received from one or more sensors 206. In some embodiments, encryption/decryption with a security co-processor may be combined with hardware and/or software tokens. In some embodiments, data acquisition unit 210 may encode and decode data received from a sensor in a specific format. For example, data acquisition unit 210 may encode raw images from a camera to generate JPEG images. Data acquisition unit 210 may perform backup and restore functions, which may be performed in connection with a data storage device and software that is directly or indirectly attached to one or more sensors 206. In some embodiments, data acquisition unit 210 may perform task specific functions such as machine learning inference, machine learning training, object detection, speech recognition, data anonymization, etc.

For ease of illustration, FIG. 2 shows one block for each of camera 204, sensors 206, user interface 208, and data acquisition unit 210. Blocks 204, 206, 208, and 210 may represent multiple respective cameras, sensors, user interfaces, and data acquisition units. In other embodiments, client device 200 may not have all of the components shown and/or may have other elements including other types of elements instead of, or in addition to, those shown herein. For example, depending on the particular embodiment, data acquisition unit 210 may operate in connection with embedded computing devices, personal computers, desktops, special purpose processing units, field programmable gate arrays (FPGAs), application specific integrated circuits (ASICs), embedded processing, etc.

Figure 3:
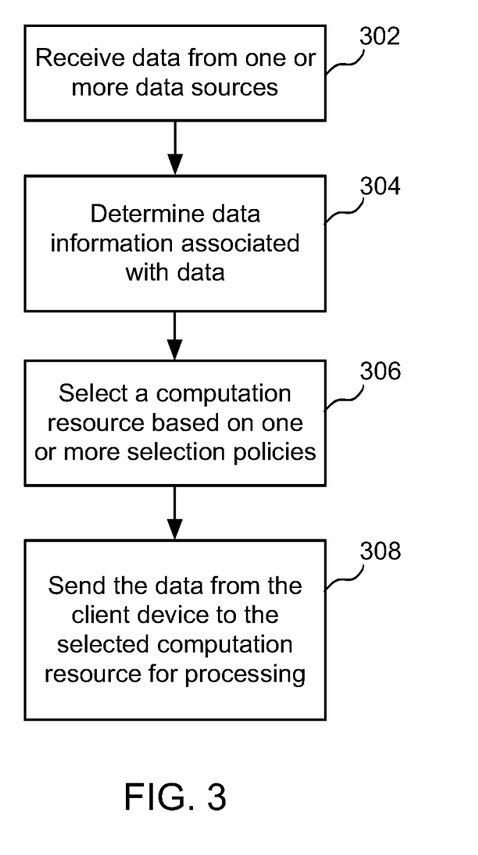
FIG. 3 illustrates an example flow diagram for processing data, according to some embodiments.

FIG. 3 illustrates an example flow diagram for processing data, according to some embodiments. Although the steps, operations, or computations in FIG. 3 are presented in a specific order for the sake of explanation, the order of steps, operations, and/or computations may be changed in other embodiments of the invention. In some particular embodiments, multiple steps shown as sequential in this specification may be performed at the same time. Also, some embodiments may not have all of the steps shown and/or may have other steps instead of, or in addition to, those shown herein.

Referring to both FIGS. 1 and 2, a method is initiated at block 302, where a system such as client device 102 receives data from one or more data sources. In some embodiments, the data includes photos, and where the at least one data source is a camera. For example, the system may collect photos (or video) directly from an integrated camera. In some embodiments, the data includes sensor data, and where the at least one data source is a sensor. For example, the system may collect sensor data from sensors, which may include perception sensors, positioning sensors, and vehicle state estimation sensors, among other sensors. In some embodiments, the data may include data inputted into a user interface by a user. In some embodiments, the data may include data that the system collects from other systems through a network.

At block 304, the system determines data information associated with the data. In some embodiments, the data information may include location information associated with the at least one data source. For example, the system may determine its geographic location when particular data was obtained. In some embodiments, the data information may include time information associated with the at least one data source. For example, the system may determine the time when particular data was obtained. The client device may generate a time stamp for each unit of data.

In some embodiments, the data information may include the type of data. The system may determine the type of data based on the source and/or the type of file in which the data is stored. For example, the system may determine the particular source such as which camera or sensor provided the particular data, or if the data was inputted to a user interface by the user. Such determined sources may be indicative of the type of data. For example, data from a camera will include images, which may be in the form of photos and videos. Photos are typically stored in particular types of files (e.g., .gif files, .jpg files, etc.). Similarly, videos are typically stored in particular types of files (e.g., .mp4 files, .mov files, etc.). As such, the file type is indicative of the type of data. In various embodiments, the data information may also include metadata, which includes additional information about the data (e.g., geo stamp, time stamp, etc.). In some embodiments, the data information includes software application information (e.g., type of software that may have performed any preprocessing, etc.), an amount of data (e.g., number of bytes, etc.), and/or a sampling frequency (e.g., number of samples per second, etc.).

At block 306, the system selects a computation resource based on one or more selection policies. In various embodiments, the selection policies are associated with one or more of location constraints, time constraints, and data type constraints. Example embodiments directed to selection policies are described in more detail below in connection with FIG. 4.

At block 308, the system sends the data from the client device to the selected computation resource for processing. For example, the system may send data to local data center 108, base station data center 110, edge device 112, cloud data center 114, CDN 116, and remote data center 118. In some embodiments, a computation resource performs one or more of processing, data storage, and retrieval of the data.

In various embodiments, the system may send different data to different computation resources based on the selection policies. For example, the system may send photos to a local data center based on a policy to send data associated with photos to a computation resource that is geographically close to the source of the data. In another example, the system may send vehicle data to a base station data center for collection of local traffic data. In some embodiments, the same data may be forwarded to a remote data center or the client device may also send copies of the same data to a remote data center for collection of regional traffic data.

In various implementations, the system may receive processed data from the computation resource. The particular usage of such processed data may vary, depending on the particular embodiment. For example, such processed data may include aggregated data from multiple client devices. In an example embodiment, the system may subsequently receive vehicle data such as location data of other vehicles in the vicinity. The system may display real-time traffic data to a person driving the vehicle or provide such data to an autonomous vehicle application. In a mapping application, an application may perform three-dimensional (3D) geometric map creation, semantic map creation (which includes the semantics of the road like traffic signs, street names, lane line information or traffic signals, etc.), and may generate road network and road rules information. As such, embodiments of the invention provide intelligent decisions as to where to perform computations in a network stack. Embodiments provide context-aware and spatially optimized data storage and retrieval, as well as optimal bandwidth usage. Embodiments also leverage multiple data sources (e.g., multiple client devices, etc.).

Figure 4:
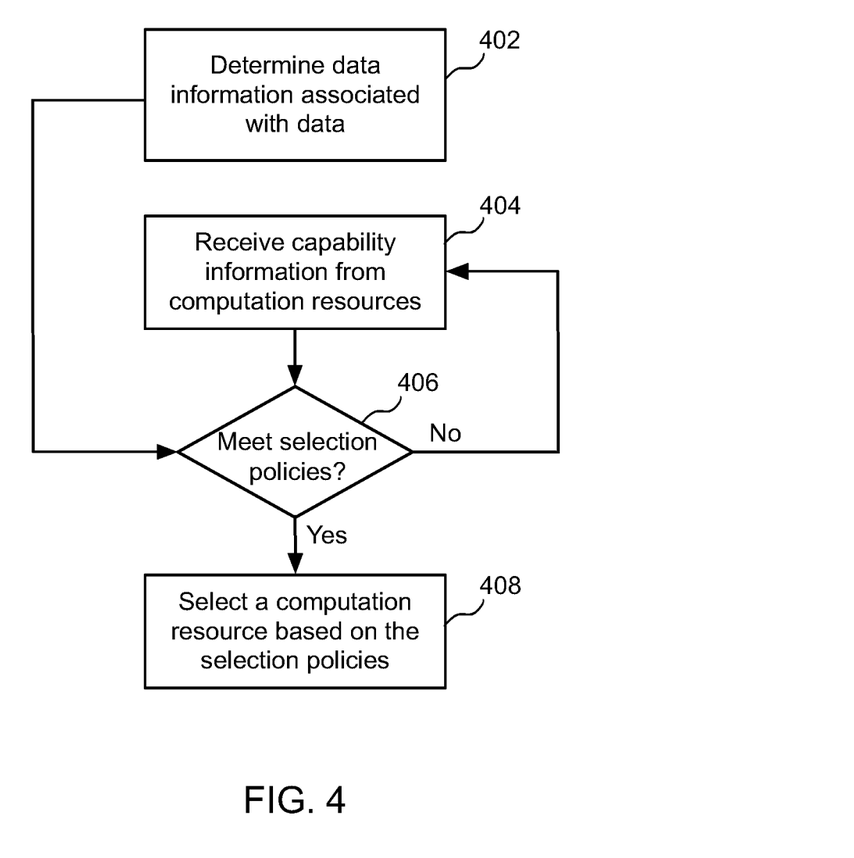
FIG. 4 illustrates an example flow diagram for selecting a computation resource for processing data, according to some embodiments.

FIG. 4 illustrates an example flow diagram for selecting a computation resource for processing data, according to some embodiments. Although the steps, operations, or computations in FIG. 4 are presented in a specific order for the sake of explanation, the order of steps, operations, and/or computations may be changed in other embodiments of the invention. In some particular embodiments, multiple steps shown as sequential in this specification may be performed at the same time. Also, some embodiments may not have all of the steps shown and/or may have other steps instead of, or in addition to, those shown herein.

Referring to both FIGS. 1 and 3, a method is initiated at block 402, where a system such as client device 102 determines data information associated with received data. For example, as indicated herein, data information may include time information associated with the data source. The data information may also include the type of data, any associated software application information, an amount of data, sampling frequency, etc.

At block 404, the system receives capability information from one or more computation resources. For example, the system may receive capability information from one or more of local data center 108, base station data center 110, edge device 112, cloud data center 114, CDN 116, and remote data center 118. Such received capability information by result from requests for capability information that the system sends to various computation resources.

At block 406, the system determines if one or more of the computation resources meet one or more selection policies. If not, the system receives capability information from other computation resources, based on requests that the system sends to those computation resources. Example selection policies are described in more detail herein.

At block 408, the system selects the computation resource based on the one or more selection policies if the system determines that one or more of the computation resources meet the one or more selection policies. In various embodiments, the selection policies are associated with one or more of location constraints, time constraints, and data type constraints. For example, in some embodiments, at least one selection policy is to select a computation resource based on the location of the at least one data source. In some embodiments, at least one selection policy is to select a computation resource that is physically located in the same geographic boundary as the at least one data source. In some embodiments, at least one selection policy is to select a computation resource based on one or more characteristics of the computation resource. In some embodiments, the one or more characteristics of the computation resource include one or more of computational power, available storage, current load, network latency, bandwidth, etc. For example, if a software application at the client device requires heavy computation, a selection policy may require a computation resource to have a certain amount of computational power (e.g., CPU or GPU computations per second). If a software application collects a large amount of data, a selection policy may require a computation resource to have a certain amount of storage capacity (e.g., amount of petabyte).

In some embodiments, at least one selection policy is to select a computation resource that meets the resource requirements associated with location constraints. For example, a policy may require a computation resource that has the closest virtual distance to the client device, where the virtual distance is based on a number of network hops. For example, a selection policy may be to select a computation resource that has the fewest number of network hops while meeting other selection policy requirements. In other embodiments, at least one selection policy is to select a computation resource that meets the resource requirements and has the least physical distance between the computation resource and the client device. For example, a selection policy may be to select a computation resource that has the smallest physical distance while simultaneously meeting other selection policy requirements. In still other embodiments, at least one selection policy is to select a computation resource that meets the resource requirements and that is located within a geographic boundary. For example, a selection policy may be to select a computation resource that is in the same specific district of a city as the client device, or more generally in the same city or metropolitan area as the client device. The selected computation resource may provide traffic data to vehicles in the geographic boundary, for example. In still other embodiments, at least one selection policy is to select a computation resource that has special resources. For example, the computational resource may be a content delivery network (CDN) or a special-purpose computation resource (e.g., local data center) that locally stores and/or caches large amounts of data, and thus may be appropriate types of computation resources to select.

In some embodiments, at least one selection policy is to select a computation resource that meets the resource requirements associated with time constraints. For example, a selection policy may require a computation resource with sufficient computation speed. In various scenarios a computation resource having GPUs, which perform faster that CPUs. This reduces latencies.

In some embodiments, at least one selection policy is to select a computation resource that meets the resource requirements associated with data type constraints. For example, a selection policy may require that certain types of data such as local traffic data be sent to a particular local computation resource. In another example, camera data may be sent to a particular local computation resource.

In some embodiments, if two or more computation resources meet the selection policy, the system may select the first computation resource that meets the selection policy rather than look at multiple computation resources to compare data centers. In some embodiments, the system may request capability information from multiple computation resources and then select the optimal computation resource. The particular selection process between two or more qualifying candidate computation resources may vary, and will depend on the specific embodiment.

In some embodiments, the system may switch computation resources when the client device changes locations (e.g., moves to a different city or region during travel) or if the current computation resource becomes unavailable or circumstances at the current computation resource change substantially, compromising performance. For example, the current computation resource may start to run low on storage capacity or may become overloaded with computational demands, etc. If another computation resource that meets the selection policy becomes available, the system may select the new computation resource that meets the resource requirements and switch to the new computation resource.

Figure 5:
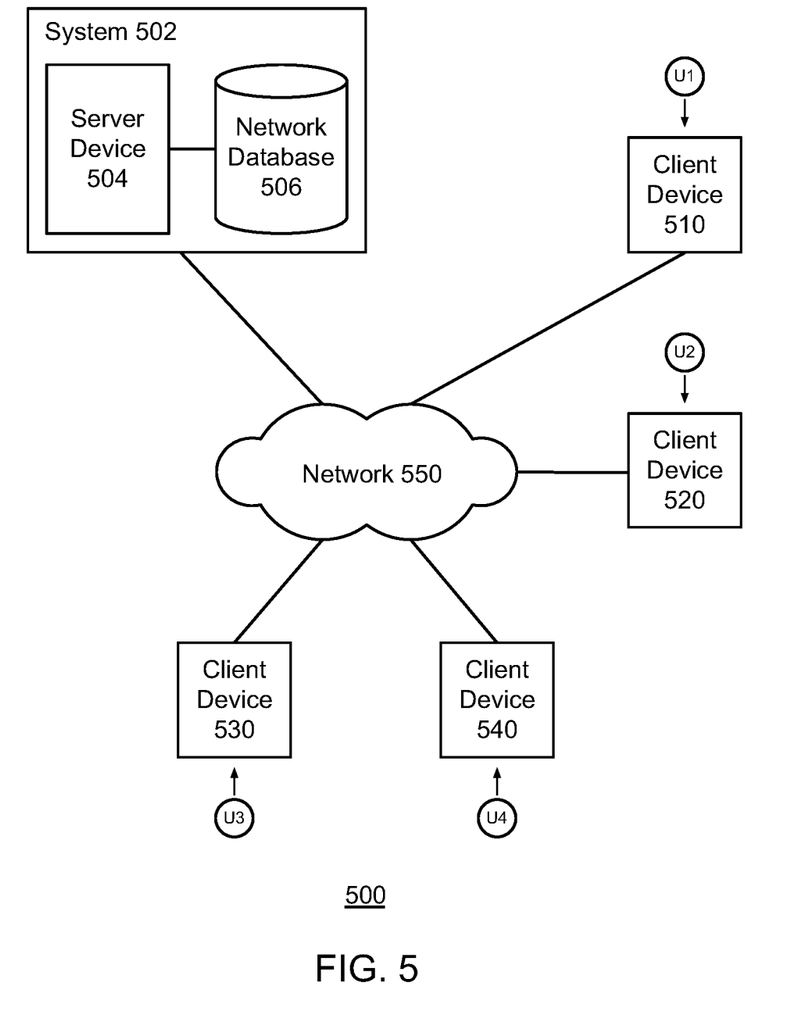
FIG. 5 illustrates a block diagram of an example network environment 500, which may be used for some embodiments described herein.

FIG. 5 illustrates a block diagram of an example network environment 500, which may be used for some embodiments described herein. In some embodiments, network environment 500 includes a system 502, which includes a server device 504 and a network database 506. Network environment 500 also includes client devices 510, 520, 530, and 540, which may communicate with each other directly or via system 502. Network environment 500 also includes a network 550.

For ease of illustration, FIG. 5 shows one block for each of system 502, server device 504, and network database 506, and shows four blocks for client devices 510, 520, 530, and 540. Blocks 502, 504, and 506 may represent multiple systems, server devices, and network databases. Also, there may be any number of client devices. In other embodiments, network environment 500 may not have all of the components shown and/or may have other elements including other types of elements instead of, or in addition to, those shown herein. In various embodiments, users U1, U2, U3, and U4 may be users of respective client devices 510, 520, 530, 540.

In the various embodiments described herein, a processor of system 502 and/or a processor of any client device 510, 520, 530, and 540 causes the elements described herein (e.g., information, etc.) to be displayed in a user interface on one or more display screens.

Embodiments may apply to any network system and/or may apply locally for an individual user. For example, embodiments described herein may be implemented by system 502 and/or any client device 510, 520, 530, and 540. System 502 may perform the embodiments described herein on a stand-alone computer, tablet computer, smartphone, etc. System 502 and/or any of client devices 510, 520, 530, and 540 may perform embodiments described herein individually or in combination with other devices.

Figure 6:
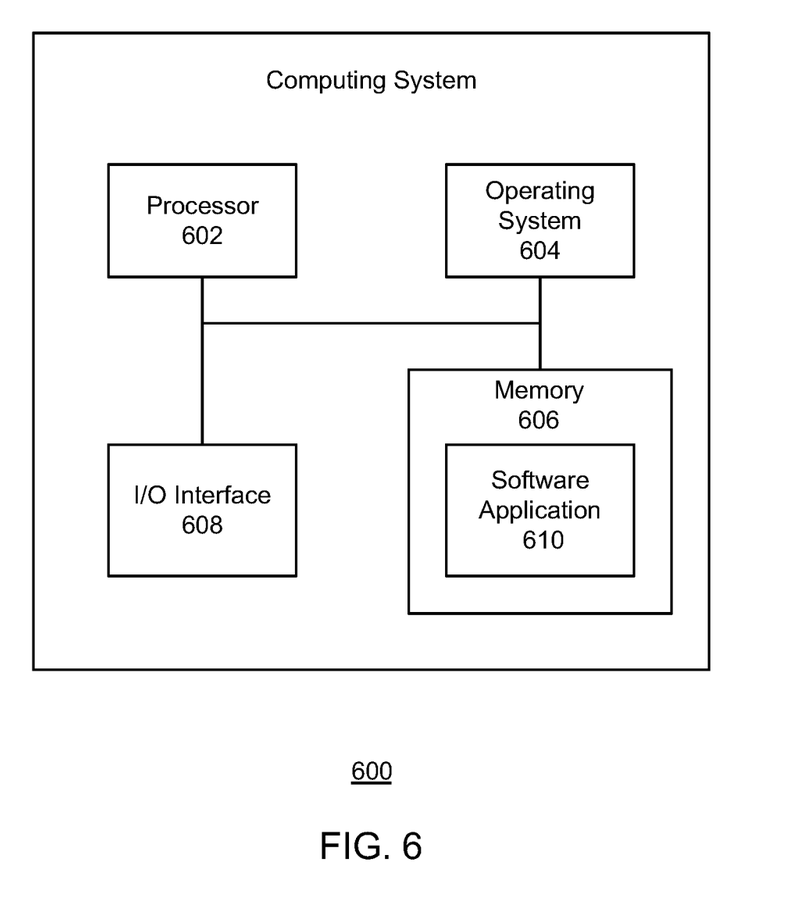
FIG. 6 illustrates a block diagram of an example computing system 600, which may be used for some embodiments described herein.

FIG. 6 illustrates a block diagram of an example computing system 600, which may be used for some embodiments described herein. For example, computing system 600 may be used to implement computing systems of client devices 102, 104, and 106, local data center 108, base station data center 110, edge device 112, cloud data center 114, content delivery network 116, remote data center 118 of FIG. 1, and server device 504 of FIG. 5, as well as to perform embodiments described herein. In some embodiments, computing system 600 may include a processor 602, an operating system 604, a memory 606, and an input/output (I/O) interface 608. In various embodiments, processor 602 may be used to implement various functions and features described herein, as well as to perform the method embodiments described herein. While processor 602 is described as performing embodiments described herein, any suitable component or combination of components of computing system 600 or any suitable processor or processors associated with computing system 600 or any suitable system may perform the steps described. Embodiments described herein may be carried out on a user device, on a server, or a combination of both.

Computing system 600 also includes a software application 610, which may be stored on memory 606 or on any other suitable storage location or computer-readable medium. Software application 610 provides instructions that enable processor 602 to perform the embodiments described herein and other functions. Software application may also include an engine such as a network engine for performing various functions associated with one or more networks and network communications. The components of computing system 600 may be implemented by one or more processors or any combination of hardware devices, as well as any combination of hardware, software, firmware, etc.

For ease of illustration, FIG. 6 shows one block for each of processor 602, operating system 604, memory 606, I/O interface 608, and software application 610. These blocks 602, 604, 606, 608, and 610 may represent multiple processors, operating systems, memories, I/O interfaces, and software applications. In various embodiments, computing system 600 may not have all of the components shown and/or may have other elements including other types of components instead of, or in addition to, those shown herein.

Although the invention has been described with respect to particular embodiments thereof, these particular embodiments are merely illustrative, and not restrictive. Concepts illustrated in the examples may be applied to other examples and embodiments.

In various embodiments, software encoded is in one or more non-transitory computer-readable media for execution by one or more processors. The software when executed by one or more processors is operable to perform the embodiments described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the embodiments described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

The embodiments described herein facilitate a system to perform various processes such as data acquisition with an input agnostic platform, data pre-processing, compression (e.g., temporal compression, spatial compression, data compression, etc.), encryption (e.g., during upload, during serving, etc.), data slicing and upload (e.g., intelligent decision making on using computation units, optimal bandwidth utilization, etc.), machine learning (e.g., training, inference, model improvements, etc.), mapping (e.g., map building, map updating, etc.), path planning, localization, data storage (e.g., map storage, map query and serving on a client agnostic platform, context and location awareness during upload, storage, and data serving, etc.), multi-vehicle coordination, monitoring, etc.

The embodiments described herein provide various benefits, e.g., providing an intelligent and context aware distributed computing platform for spatially relevant large data applications. The embodiments also achieve efficient and reliable data processing in an automated, real-time and context aware manner. As the number of active client devices grow, embodiments facilitate data handling processes and infrastructure to cater to large quantities of data being generated by the sensor suites on client devices (e.g., cell phones, autonomous vehicles, driven vehicles, etc.). In order to solve the challenges in data acquisition, processing, and monitoring, embodiments described herein provide a computing platform that intelligently distributes the workload and optimally utilizes the available computation resources and bandwidth, etc.

It will also be appreciated that one or more of the elements depicted in the drawings and figures herein can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
   a client device including one or more processors; and
   logic encoded in one or more non-transitory computer-readable storage media for execution by the one or more processors and when executed operable to perform operations comprising:
receiving, at the client device, data from at least one data source;
determining, at the client device, data information associated with the data from the at least one data source;
selecting a computation resource of a remote server from a plurality of computation resources of remote servers, the computation resource of the remote server being selected based on two or more selection policies and the data information, wherein the two or more selection policies are associated with two or more of location constraints related to the remote servers, time constraints associated with the data, and data type constraints related to the remote servers; and
sending the data from the client device to the selected computation resource of the remote server for processing.

2. The system of claim 1, wherein the data from the at least one data source includes photos, and wherein the at least one data source is a camera.

3. The system of claim 1, wherein the data from the at least one data source includes sensor data, and wherein the at least one data source is a sensor.

4. The system of claim 1, wherein the data information comprises location information associated with the at least one data source.

5. The system of claim 1, wherein the data information comprises time information associated with the at least one data source.

6. The system of claim 1, wherein the data information comprises a type of file in which the data is stored.

7. The system of claim 1, wherein at least one selection policy is to select a computation resource based on the location of the at least one data source.

8. The system of claim 1, wherein at least one selection policy is to select a computation resource based on one or more characteristics of the computation resource.

9. The system of claim 1, the operations further comprising:
receiving a notification that the selected computation resource of the remote server is running low on storage capacity or is becoming overloaded with computational demands;
selecting another computation resource of another remote server that satisfies the two or more selection policies associated with two or more of the location constraints of the remote servers, the time constraints associated with the data, and the data type constraints of the remote servers; and
sending at least a portion of the data from the client device to the other selected computation resource.

10. A non-transitory computer-readable storage medium with program instructions stored thereon, the instructions when executed by one or more processors cause the one or more processors to perform operations comprising:
receiving, at a client device, data from at least one data source;
determining, at the client device, data information associated with the data from the at least one data source;
selecting a computation resource of a remote server from a plurality of computation resources of remote servers, the computation resource of the remote server being selected based on two or more selection policies and the data information, wherein the two or more selection policies are associated with two or more of location constraints related to the remote servers, time constraints associated with the data, and data type constraints related to the remote servers; and
sending the data from the client device to the selected computation resource of the remote server for processing.

11. The non-transitory computer-readable storage medium of claim 10, wherein the data from the at least one data source includes photos, and wherein the at least one data source is a camera.

12. The non-transitory computer-readable storage medium of claim 10, wherein the data from the at least one data source includes sensor data, and wherein the at least one data source is a sensor.

13. The non-transitory computer-readable storage medium of claim 10, wherein the data information comprises location information associated with the at least one data source.

14. The non-transitory computer-readable storage medium of claim 10, wherein the data information comprises time information associated with the at least one data source.

15. The non-transitory computer-readable storage medium of claim 10, wherein the data information comprises a type of file in which the data is stored.

16. The non-transitory computer-readable storage medium of claim 10, wherein at least one selection policy is to select a computation resource based on the location of the at least one data source.

17. The non-transitory computer-readable storage medium of claim 10, wherein at least one selection policy is to select a computation resource based on one or more characteristics of the computation resource.

18. A computer-implemented method comprising:
receiving, at a client device, data from at least one data source;
determining, at the client device, data information associated with the data from the at least one data source;
selecting a computation resource of a remote server from a plurality of computation resources of remote servers, the computation resource of the remote server being selected based on two or more selection policies and the data information, wherein the two or more selection policies are associated with two or more of location constraints related to the remote servers, time constraints associated with the data, and data type constraints related to the remote servers; and
sending the data from the client device to the selected computation resource of the remote server for processing.

19. The computer-implemented method of claim 18, wherein the data from the at least one data source includes photos, and wherein the at least one data source is a camera.

20. The computer-implemented method of claim 18, wherein the data from the at least one data source includes sensor data, and wherein the at least one data source is a sensor.

21. The computer-implemented method of claim 18, wherein the data information comprises location information associated with the at least one data source.

* * * * *